United States Patent [19]

Ichikawa et al.

[11] Patent Number: 5,754,966
[45] Date of Patent: May 19, 1998

[54] METHOD AND APPARATUS FOR STEERING REAR WHEEL FOR FOUR WHEEL STEERING VEHICLE

[75] Inventors: Toshiro Ichikawa; Hideaki Nakamura, both of Atsugi, Japan

[73] Assignee: Unisia Jecs Corporation, Atsugi, Japan

[21] Appl. No.: 513,738

[22] Filed: Aug. 10, 1995

[51] Int. Cl.⁶ .................................................. B62D 6/00
[52] U.S. Cl. ........................ 701/41; 280/91.9; 180/410
[58] Field of Search ............... 364/424.051, 424.052; 280/91.1; 180/408, 410, 411, 412, 421, 422, 423, 415; 701/41, 42

[56] References Cited

U.S. PATENT DOCUMENTS

| | | | |
|---|---|---|---|
| 4,441,572 | 4/1984 | Ito et al. | 180/415 |
| 4,679,809 | 7/1987 | Ito et al. | 364/424.051 |
| 4,718,685 | 1/1988 | Kawabe et al. | 180/415 |
| 5,019,982 | 5/1991 | Furukawa | 364/424.051 |
| 5,365,440 | 11/1994 | Abe et al. | 364/424.051 |

FOREIGN PATENT DOCUMENTS

| | | |
|---|---|---|
| 2-254061 | 10/1990 | Japan. |
| 5-229449 | 9/1993 | Japan. |

*Primary Examiner*—Gary Chin
*Attorney, Agent, or Firm*—Foley & Lardner

[57] ABSTRACT

A rear wheel steer control method and apparatus for a four wheel steer vehicle executes an opposite phase steer control on the basis of detected values of a front wheel steer angle sensor and a vehicle speed sensor during a low vehicle speed. The opposite phase steering is stopped for a predetermined distance from a start of straight running, then the rear wheel steer angle is controlled by a primary delay control. When the front wheel steer angle is decreased, the primary delay control is stopped in a predetermined condition. Therefore, the four wheel steer vehicle gives a smooth steer feeling to a driver in every driven condition.

17 Claims, 9 Drawing Sheets

METHOD AND APPARATUS FOR STEERING REAR WHEEL FOR FOUR WHEEL STEERING VEHICLE

BACKGROUND OF THE INVENTION

1. Field of the Invention

The present invention relates to a rear wheel steer control apparatus for a four wheel steer vehicle, and more particularly to a method and apparatus for controlling the rear wheel steer angle where a phase reversal control of the four wheel steer vehicle is executed.

2. Description of the Related Art

Various types of rear wheel steer control apparatus for four wheel steer vehicles have been proposed and in practical use. Japanese Patent Provisional Publication No. 2-254061 discloses a typical rear wheel steer control apparatus which includes an phase reversal steering mechanism for improving a sharp turning performance at a low vehicle speed. This rear wheel steer control apparatus of a four wheel steer vehicle is provided with a touch sensor in order to avoid a damage to the vehicle when the vehicle causes an overhand at a rear corner during a low-speed sharp turning. More particularly, the rear wheel steer control apparatus is arranged to adjust the steer angle of rear wheels to a neutral position or to the same angle as that of the front wheels when the touch sensor detects the contact with an obstacle. However, since this apparatus has a limit that the protective operation of the vehicle is executed after the detection of the contact with an obstacle, the touch sensor is required to perform a quick response at plural parts for avoiding the damage to the vehicle. Further, this apparatus is complicated in construction and is increased in manufacturing cost by employing the touch sensor.

Japanese Patent Provisional Publication No. 5-229449 discloses another typical rear wheel steer control apparatus which is arranged to stop an opposite phase steer (reversal phase control of rear wheels with respect to front wheels until a vehicle is driven for a predetermined distance from a stopped position. This apparatus is arranged to control the rear wheel steer angle by means of a proportional control with respect to the front wheel steer angle. However, in order to ensure a further smooth steer feeling for a driver, further improvements in such rear wheel steer control apparatus are required.

SUMMARY OF THE INVENTION

It is an object of the present invention to provide an improved rear wheel steer control method and apparatus which enable continuous operation for the prevent of contact due to the opposite phase steering during the driving of the vehicle without generating a strange feeling to a vehicle driver.

A first aspect of the present invention resides in a method for controlling rear wheels of a four wheel steer vehicle comprises the steps in the order named: 1) A vehicle speed is detected. 2) A steer angle of a pair of front wheels is detected. 3) A steer angle of a pair of rear wheels is detected. 4) A target steer angle of the rear wheels is calculated according to the detected vehicle speed, the detected steer angle of the front wheels and the following equation, $$\delta_r = K \cdot \delta_f (1 - e^{-(x-L)/V\tau})$$

wherein $\delta_r$ is the target steer angle of the rear wheels, $\delta_f$ is the steer angle of the front wheels, K is a steer angle ratio ($\delta_r/\delta_f$), x is a travel distance from start of the vehicle, $L_r$ is a distance from an axis of the rear wheels to a rear end of the vehicle, and τ is a time constant of a primary delay. 5) The rear wheels are controlled so that the detected steer angle of the rear wheels is converged into the target steer angle of the rear wheels.

A second aspect of the present invention resides in the method for controlling rear wheels of a four wheel steer vehicle comprises the steps of the order named: 1) A vehicle speed is detected. 2) A steer angle of a pair of front wheels is detected. 3) A steer angle of the rear wheels is detected. 4) A target steer angle of the pair of rear wheels is calculated according to the detected vehicle speed, the detected steer angle of the front wheels and one of two equations (A) and (B), $$\delta_r = K \cdot \delta_f (1 - e^{-(x-L)/V\tau}) \quad (A)$$

wherein $\delta_r$ is the target steer angle of the rear wheels, $\delta_f$ is the steer angle of the front wheels, K is a steer angle ratio ($\delta_r/\delta_f$), x is a travel distance from start of the vehicle, $L_r$ is a distance from an axis of the rear wheels to a rear end of the vehicle, and τ is a time constant of a primary delay, and $$\delta_r = k \cdot \delta_f \quad (B)$$

wherein k is one of a front wheel steer condition K' or the steer angle ratio K. 5) The steer angle of the rear wheel is controlled so as to be converged into the target steer angle.

A third aspect of the present invention resides in a rear wheel steer control apparatus of a four wheel steer vehicle. The rear wheel steer control apparatus comprises a front wheel steer angle detecting means for detecting a steer angle of a pair of front wheels. A vehicle travel distance detecting means detects a travel distance of the vehicle. A vehicle speed detecting means detects a speed of the vehicle. A steer angle ratio setting means sets the steer angle ratio (K) between the front wheel steer angle and rear wheel steer angle according to the vehicle speed. A target rear wheel steer angle calculating means calculates the target rear wheel steer angle on the basis of the detected values of the front wheel steer angle detecting means and the travel distance detecting means and the following equation, $$\delta_r = K \cdot \delta_f (1 - e^{-(x-L)/V\tau})$$

wherein $\delta_r$ is the target steer angle of the rear wheels, $\delta_f$ is the steer angle of the front wheels, K is a steer angle ratio ($\delta_r/\delta_f$), x is a travel distance from start of the vehicle, $L_r$ is a distance from an axis of the rear wheels to a rear end of the vehicle, and τ is a time constant of a primary delay. A rear wheel steer angle detecting means detects an actual steer angle of a pair of rear wheels. A rear wheel steer angle controlling means controls the steer angle of the rear wheels such that the actual rear wheel steer angle is adjusted at the target value of the rear wheel steer angle.

A fourth aspect of the present invention resides in a rear wheel steer control apparatus of a four wheel steer vehicle which comprises a front wheel steer angle detecting means for detecting a steer angle of a pair of front wheels. A vehicle travel distance detecting means detects a travel distance of the vehicle. A vehicle speed detecting means detects a speed of the vehicle. A steer angle ratio setting means sets a ratio (K) between the front wheel steer angle and the rear wheel steer angle according to the vehicle speed. A vehicle travel direction detecting means detects a travel direction of the vehicle. A first target rear wheel steer angle calculating means calculates a target rear wheel steer angle on the basis of the detected values of the front wheel steer angle detecting means and the travel distance detecting means, and a following first equation, $$\delta_r = K \cdot \delta_f (1 - e^{-(x-L)/v\tau})$$

wherein $\delta_r$ is the target steer angle of the rear wheels, $\delta_f$ is the steer angle of the front wheels, K is a steer angle ratio ($\delta_r/\delta_f$), x is a travel distance from start of the vehicle, $L_r$ is a distance from an axis of the rear wheels to a rear end of the vehicle, and $\tau$ is a time constant of a primary delay. A rear wheel steer angle detecting means detects an actual steer angle of the rear wheels. A second rear wheel steer angle calculating means calculates the target rear wheel steer angle on the basis of the detected values of the steer angle setting means, and the following second equation, $$\delta_r = k \cdot \delta_f$$

wherein k is the steer angle ratio K. A switching means switches the execution of the calculations of the first and second target rear wheel steer angle calculating means according to the detected result of the vehicle proceeding direction detecting means such that the calculation by the first target rear wheel steer angle calculating means is executed when the vehicle runs forward and that the calculation by the second target rear wheel steer angle calculating means is executed when the vehicle runs backward. A rear wheel steer angle controlling means controls the steer angle of the rear wheel such that the actual rear wheel steer angle is adjusted at the target rear wheel steer angle which is calculated by one of the first and second target rear wheel steer angle calculating means.

DETAILED DESCRIPTION OF THE INVENTION

With reference to the drawings, the embodiments of a rear wheel steer control apparatus according to the present invention will be discussed hereinafter.

Figure 1:
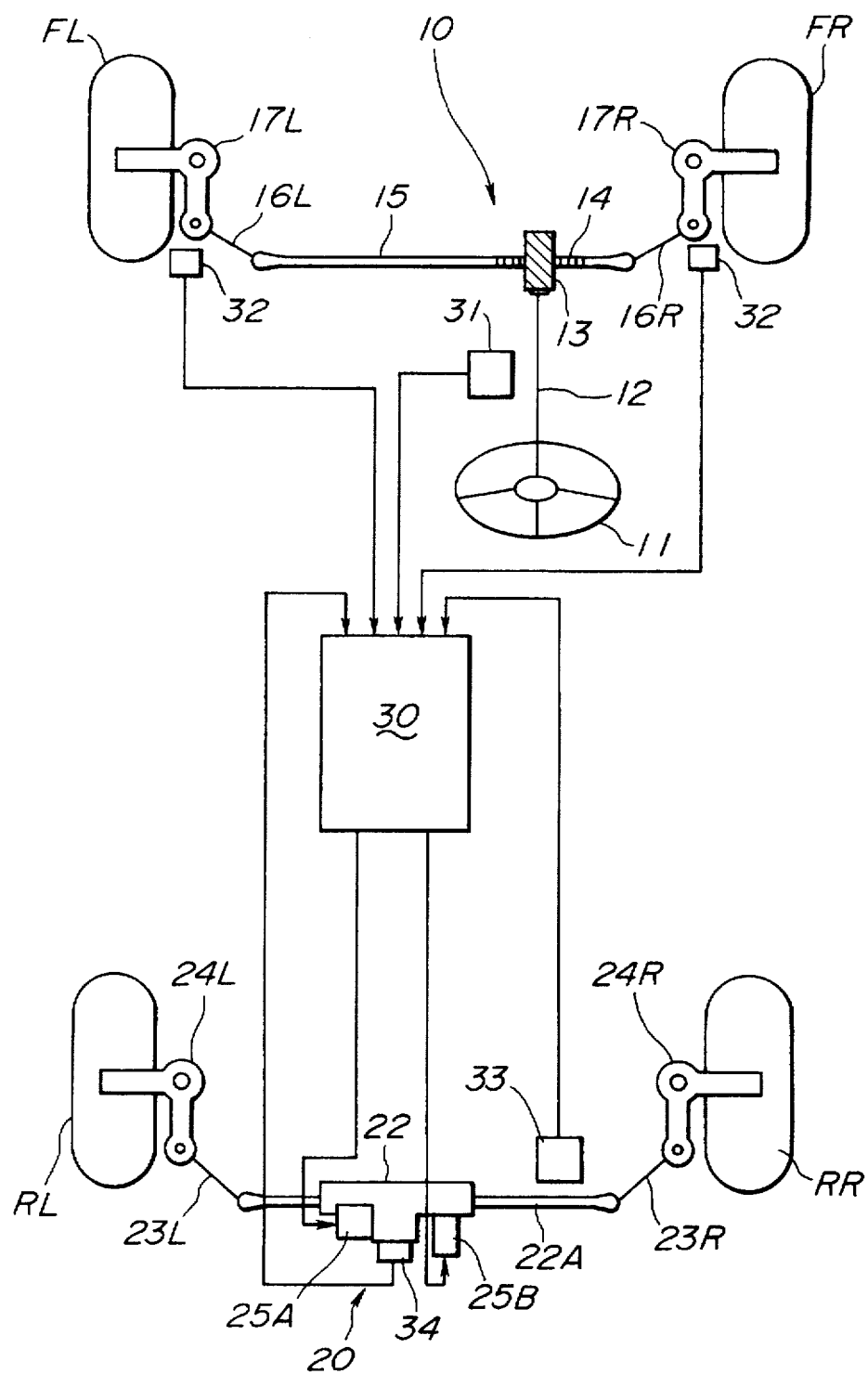
FIG. 1 is a schematic view which shows a construction of a four wheel steer system of a first embodiment according to the present invention.

Referring to FIG. 1, there is shown a first embodiment of the rear wheel steer control apparatus for a four wheel steer vehicle in accordance with the present invention. The front wheel steer control apparatus comprises a front wheel steering device 10 for steering a pair of front wheels FL and FR. The front wheel steering device 10 comprises a steering shaft 12 which is rotatably connected with a vehicle body. An end of the steering shaft 12 is fixed to a steering wheel 11. The pair of front wheels FL and FR are connected to a front wheel steer rod 15 through a pair of tie rods 16L and 16R and a pair of knuckle arms 17L and 17R. The front wheel rod 15 is reciprocatingly movable in the lateral direction of the vehicle so as to steer the front wheels FL and FR. The front wheel steer rod 15 is provided with a rack 14 which is engaged with a pinion 13 fixed to an tip end portion of the steering shaft 12.

The rear wheel steer control apparatus comprises a rear wheel steering device 20 for steering a pair of rear wheels RL and RR. The rear wheel steering device 20 is provided with a rear wheel steering mechanism 22 which comprises an operation rod 22A. The operation rod 22A is movable in the lateral direction of the vehicle. A pair of rear wheels RL and RR are steered by the rear wheel steer mechanism 22 through a pair of knuckle arms 24L and 24R interconnected with a pair of tie rods 23L and 23R, respectively. The rear wheel steer mechanism 22 comprises first and second servo motors 25A and 25B. The first servo motor 25A is rotated to move the operation rod 22A in the direction of an axle of the rear wheels in order to steer the rear wheels RL and RR through a speed reducer. The second servo motor 25B is rotated to limit the steer angle of the rear wheels RL and RR. That is, a mechanism for limiting a maximum steer angle of the rear wheels RL and RR is installed in the rear wheel steering device 20.

The above-mentioned vehicle, which is provided with front and rear wheel steering devices 10 and 20, comprises a control unit 30 whose main component is a micro computer and which controls the steer angle of the rear wheels RL and RR by sending a drive signal to the first and second servo motors 25A and 25B.

The control unit 30 is connected with a front wheel steer angle sensor 31 for detecting a steered angle of the steering shaft 12, a vehicle wheel speed sensor 32, a rear wheel steered angle sensor 33 which detects a steered angle of the rear wheels RL and RR from the moved amount of the operation rod 22A and a sensor 34 which detects a restriction amount of the rear wheel maximum steer angle limiting mechanism. The control unit 30 is arranged to receive the signals from these sensors.

The vehicle wheel speed sensor 32 is of a type which generates a pulse at each predetermined rotation angle of the wheels and which is applied to an anti-lock braking system. The period of the generated pulse indicates a travel distance by a unit distance x. The control unit 30 is electrically connected with an inhibitor switch for detecting a neutral position and a parking position of an automatic transmission or manual transmission, and an engine switch for detecting an operation of the engine, in order to receive data indicative of a vehicle condition.

Figure 3A:
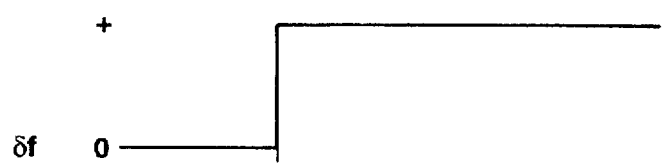
FIG. 3A is a time chart which shows a change of the front wheel steer angle.
Figure 3B:
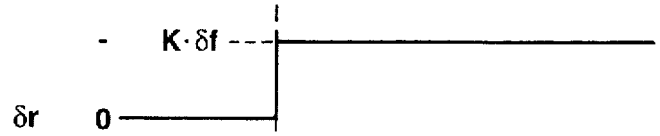
FIG. 3B is a time chart which shows a change of the rear wheel steer angle in proportion to the front wheel steer angle of FIG. 3A.

In a conventional four wheel steer vehicle, as shown in FIG. 3A and FIG. 3B, a target rear wheel steer angle $\delta_r$ r is obtained from an equation $\delta_r = K \cdot \delta_f$, a front steer angle $\delta_f$ at a start time of a cornering and a steer angle ratio K based on a vehicle speed. Then, the rear wheels are controlled so that the actual rear wheel steer angle is converged into the target rear wheel steer angle.

Figure 3C:
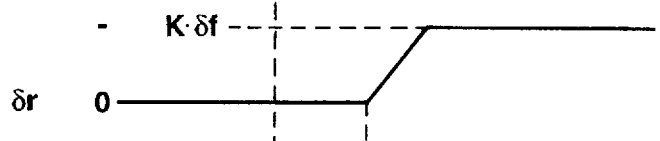
FIG. 3C is a time chart which shows a change of the rear wheel steer angle according to a conventional method of JP-A-5-229449.

On the other hand, according to the control disclosed in JP-A-5-229449, a steering of the rear wheels is forbidden from a start of the vehicle to a predetermined travel distance, then the rear wheels are controlled so that an actual rear wheel steer angle is converged into a target rear wheel steer angle which is generally proportional with the front wheel steer angle. FIGS. 3A and 3C show this control wherein the distance from a start to a predetermined travel distance is converted into a time form, and the steering of the front wheels is started at a start of the vehicle.

Figure 3D:
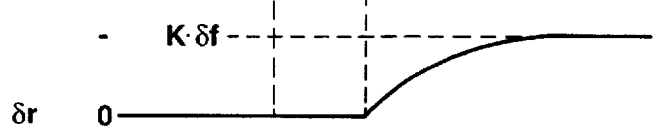
FIG. 3D is a time chart which shows a change of the rear wheel angle according to a primary delay control according to the present invention.

In contrast, according to the present invention, to avoid the radical change of the steer angle $\delta_r$ of the rear wheels at a final stage of the rear wheel steering control, the steer angle $\delta_r$ of the rear wheels is smoothly changed as shown in FIGS. 3A and 3D. Therefore, according to the present invention it becomes possible to achieve the asymptotic change of the steer angle $\delta_r$ of the rear wheels by the primary delay control.

This control employing a primary delay control in accordance with the present invention is represented by the following equation:

$$\delta_r(t) = -\frac{K}{\tau} \cdot \delta_f(t) \cdot e^{-(t-ONT)/\tau} \tag{1}$$

wherein t is a time, ONT is a wait time of the control output, and $\tau$ is a time constant of the primary delay.

However, in the equation (1) the wait time ONT of the control output is defined on the premise that the vehicle speed is constant. Accordingly, it is not preferable to apply this time dependent control to a vehicle under an extremely low vehicle speed in that the vehicle speed is largely changed. In order to enable the execution of this control on the basis of the travel distance, the equation (1) is converted into a distance dependent form as follows:

$$\delta_r(x) = -\frac{K}{\tau} \cdot \delta_f(x) \cdot e^{-(x-ONX)/\tau} \tag{2}$$

wherein ONX is a conversion of ONT into a distance dimension.

Next, the explanation as to a proper definition of ONX and $\tau$ will be discussed hereinafter with reference to FIG. 2.

Figure 2:
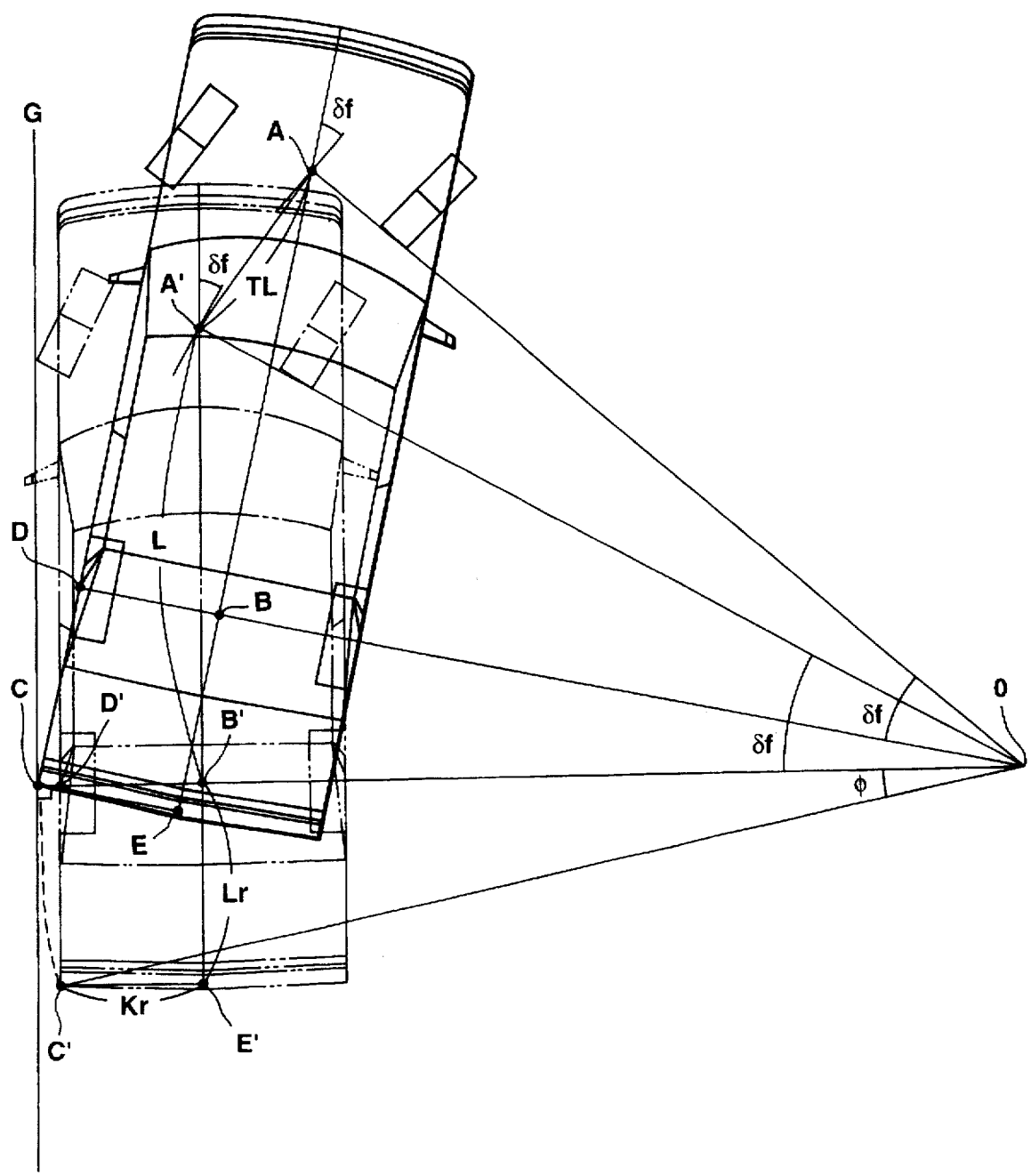
FIG. 2 is a view for explaining a vehicle behavior at a start of cornering of the vehicle.

In FIG. 2, A is an intersection between the axle of the front wheel and a center line of the vehicle. B is an intersection between the axle of the rear wheels and the center line of the vehicle. Further, $\delta_f$ is the front wheel steer angle, $\delta_r$ is the rear wheel steer angle, $K_r$ is a half of the vehicle width, and $L_r$ is a distance from the rear wheel axle to a rear end of vehicle.

As shown in FIG. 2, assuming that the vehicle starts a turn from a condition that the center line of the vehicle is parallel with a line G, that is, from a straight line driving condition, and that the rear wheel steer angle is zero and the front wheel steer angle is $\delta_f$, an overhang of the rear end portion C of the vehicle takes a maximum value at a point shown in FIG. 2. A turning angle of the vehicle from a turn starting point to the maximum point is denoted by $\phi$.

Since the angle $\angle AOB = \delta_f$, the turning angle $\phi$ is represented by the following equation:

$$\phi = \tan^{-1}(L_r/((L/\tan \delta_f) + K_r)) \tag{3}$$

A travel distance TL of the center of the front wheel axle corresponding to the turning angle $\phi$ is represented by the following equation:

$$TL = \phi \cdot L/\tan \delta_f \tag{4}$$

wherein the wheel speed sensor 32 detects an average rotational angle of the front wheel.

By combining the equations (3) and (4), the following equation is obtained.

$$TL = \frac{L \cdot L_r}{L + K_r \cdot \tan \delta_f} \tag{5}$$

Furthermore, since $K_r \cdot \tan \delta_f \ll L$, the equation (5) can be approximated by the following equation.

$$TL \approx L_r \tag{6}$$

Although $L_r$ corresponds to a distance from the rear wheel axle to the rear end of the vehicle, by designing a vehicle body to have large radius at rear corners, it becomes possible to decrease the distance $L_r$. Accordingly, if the vehicle is driven straight for a distance $TL = L_r$, and then the rear wheels are steered in an opposite phase with respect to the front wheels such that the rear corner portion C of the vehicle is moved on the line G, the overhang amount of the vehicle rear corner portion becomes the same as that of a two wheel steer vehicle. In other word, by setting $ONX = L_r$, such similar vehicle behavior is obtained.

The primary delay time constant c is represented by the following equation:

$$\tau = \left| \frac{K \cdot \delta_f}{(V(\delta_f - \delta_r)/L)} \right| \tag{7}$$

wherein V is a vehicle speed.

In the equation (7), $V(\delta_f - \delta_r)/L$ represents a turning angle per a unit time. The turning angle per a unit travel distance $\Delta x$ is $\Delta x \cdot (\delta_f - \delta_r)/L$. By setting the unit $\Delta x$ into 1 and rewriting the equation (7) in the form based on a travel distance, the following equation is obtained.

$$\tau = |K \cdot \delta_f \cdot L/(\delta_f - \delta_r)| \tag{8}$$

Further, taking into account $\delta_r \ll \delta_f$, the equation (8) can be rewritten as follows:

$$\tau \approx K \cdot L \tag{9}$$

Accordingly, the equation (2) can be rewritten in the form based on the travel distance as follows:

$$\delta_r(x) = -\frac{K}{\tau} \cdot \delta_f(x) \cdot e^{-(x-L_r/\tau)} \tag{10}$$

wherein $\tau \approx K \cdot L$.

Next, manner of a control operation in the first embodiment of the rear wheel steer control apparatus according to the present invention will be discussed hereinafter with reference to a flowchart shown in FIGS. 4A and 4B.

Figure 4A:
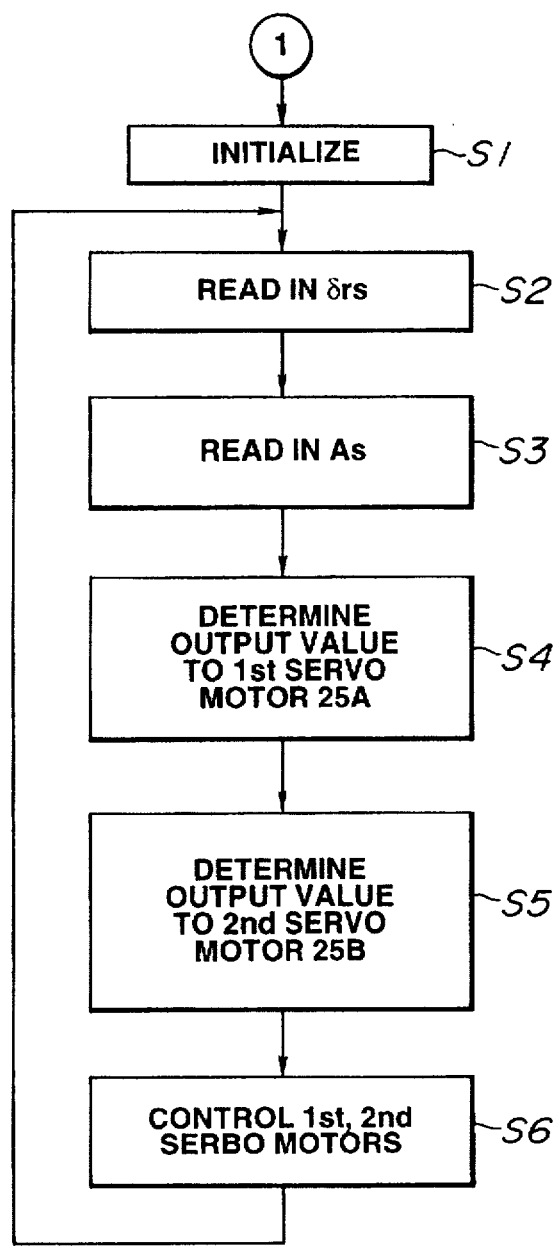
FIG. 4A is a flowchart which shows a main routine for executing the rear wheel steer control of a first embodiment according to the present invention.
Figure 4B:
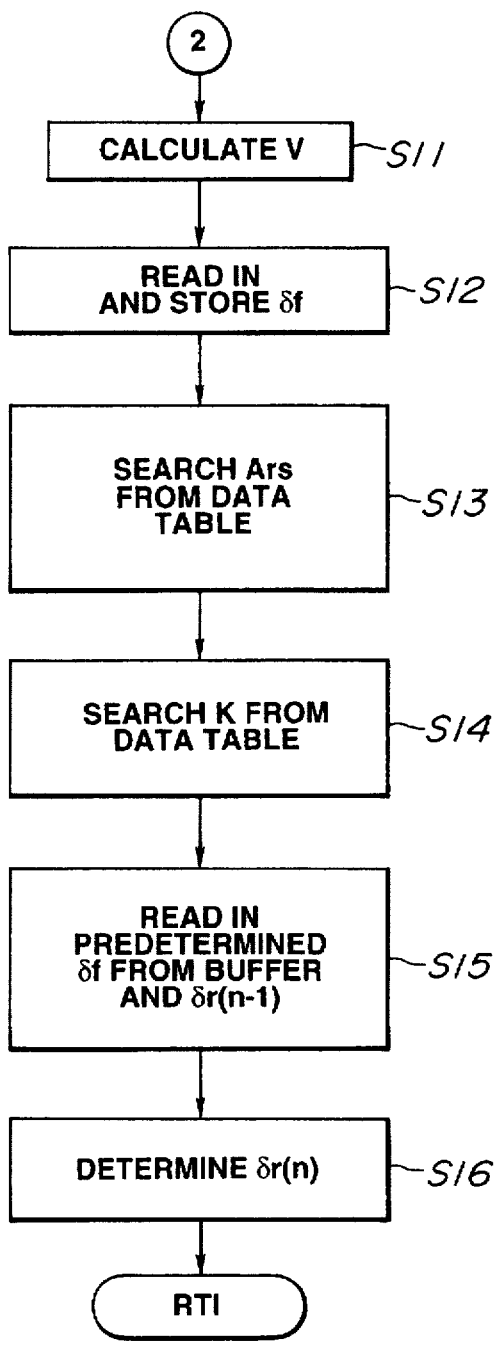
FIG. 4B is a flowchart which shows an interrupt routine for determining a target rear wheel steer angle in the first embodiment according to the present invention.

FIG. 4A shows a main routine, and FIG. 4B shows an interrupt routine. The main routine executes a current control for supplying proper electric current to the first and second servo motors, upon the control unit 30 reads in the target values of the rear wheel steer angle and the maximum steer angle range of the rear wheel from a predetermined memory address and compares a feedback value of the actual condition with the target values in order to converge the steer condition of the rear wheel to the target value. The target values of the rear wheel steer angle and the maximum steer angle range of the rear wheels are obtained by the execution of the interrupt routine of FIG. 4B.

The interrupt routine is repeatedly executed at a hardware interrupt time defined by an edge part, such as a leading edge or trailing edge, of the pulse signal generated by the wheel speed sensor 32. This interrupt routine is executed to obtain the above mentioned target values. In this embodiment, the output of the wheel speed sensor 32 is used upon periodically dividing into a half. The divided pulse period is 78 mm, and is used as a unit travel distance x.

Herein, in order to facilitate the understanding of the control procedure, a method for digitally obtaining the target rear wheel steer angle will be discussed.

Upon implementing a predetermined transform such as z-transform to the equation (10), a discrete equation for obtaining the target rear wheel steer angle can be represented as follows:

$$\delta_{r(n)} = \frac{K \cdot X}{X + 2\tau} (\delta_{f(n-m)} + \delta_{f(n-m-1)}) - \frac{X - 2\tau}{X + 2\tau} \cdot \delta_{r(n-1)} \quad (11)$$

wherein $\delta_{r(n)}$ is the present target value of the rear wheel steer angle, X is a unit travel distance (sampling period), K is a ratio between the front and rear wheel steer angles, $\delta_{f(n-m)}$ is a sampled front wheel steer angle at a time of m steps before, $\delta_{f(n-m-1)}$ is a sampled front wheel steer angle at a time of (m+1) steps before, and $\delta_{r(n-1)}$ is the target value of the rear wheel steer angle at a time of one step before.

In order to realize a control corresponding to the wait time of the above-mentioned control output in the discrete equation (12), for example, in case that the distance Lr from the rear wheel axle to the rear end portion of the vehicle is 936 mm, since the sampling period is 78 mm, number of the data of front wheel steer angle to be stored is 13 (936/78+1=13). Therefore, a buffer (ring buffer), which can store 13 data of the front wheel steer angle, may be set on the RAM of the control unit 30. In this buffer, by each storage of a latest data, data in the buffer is shifted in turn, and the oldest data is dumped (discharged) from the buffer.

The manner of operation as to the interrupt routine shown in FIG. 4B will be discussed hereinafter. This interrupt routine is executed at each pulse from the wheel speed sensor 32.

In a step S11, a vehicle speed V is calculated by measuring a time period of this interrupt routine since this interrupt routine is executed at each vehicle movement of 78 mm. Simultaneously, the control unit 30 checks whether the wheel speed sensor 32 correctly operate or not, by comparing the output of the wheel speed sensor 32 with a pulse period or frequency of a vehicle speed sensor installed in the engine transmission. If the output of the wheel speed sensor 32 largely differs from that of the other vehicle speed sensor, another routine may be executed such that the steer angle of the rear wheels is gradually returned to a neutral position, then the control of the rear wheel steer angle is stopped and the stoppage of the control due to the abnormal condition of the system is informed to a driver.

In a step S12, the control unit 30 reads in the front wheel steer angle $\delta_f$ and stores it as a newest data. It will be understood that the front wheel steer angle may be treated as a double check system, that is, by comparing two output values, the correct operation of the sensor is checked. If the sensor is not normally operated, another operation for smoothly stopping the rear wheel steer control is executed, then the stoppage thereof is informed to the vehicle passenger, as is similar to that in the step S11.

Figure 5A:
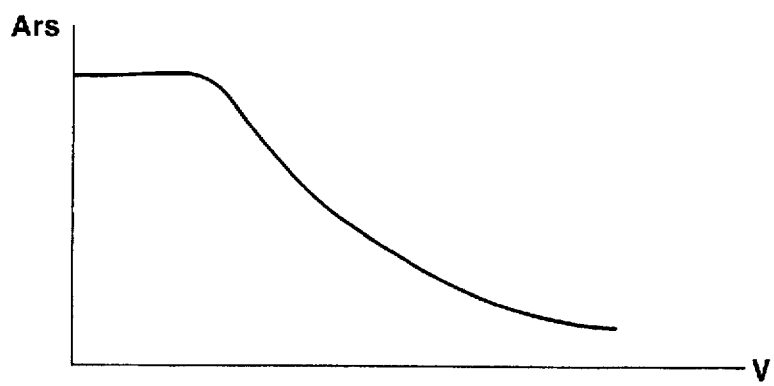
FIG. 5A is a graph which shows a relationship between the rear wheel steer angle generated range and the vehicle speed.

In a step S13, the control unit 30 searches the target value of the rear wheel steer angle generated range Ars from the data table according to the vehicle speed V, then stores the obtained target value in a predetermined memory address. As shown in FIG. 5A, the rear wheel steer angle generated range Ars is set so that higher the vehicle speed V becomes, lower the range Ars becomes.

Figure 5B:
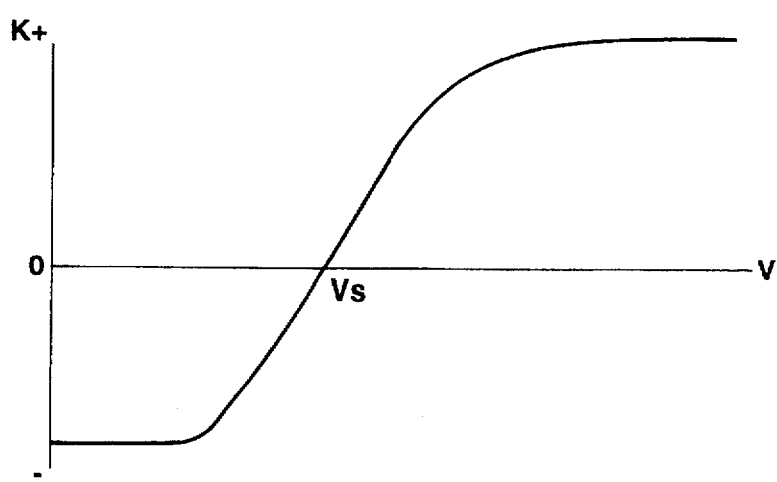
FIG. 5B is a graph which shows a relationship between the front and rear steer angle ratio and the vehicle speed.

In a step S14, the control unit 30 searches a steer angle ratio K, which indicates a ratio between the front wheel steer angle and the rear wheel steer angle, from another data table according to the vehicle speed V. As shown in FIG. 5B, the steer angle ratio K takes zero on a standard vehicle speed Vs, taking a minus value (reverse phase) when the vehicle speed V is lower than the standard speed Vs, and taking a plus value (same phase) when larger than the standard speed Vs.

In a step S15, the control unit 30 reads two oldest data $\delta_{f(n-m)}$ and $\delta_{f(n-m-1)}$ of the front wheel steer angle values stored in the buffer, and data at a time of one step before is read in.

In a step S16, the control unit 30 determines a present target value $\delta_{r(n)}$ of the rear wheel steer angle by executing a calculation of the equation (11) by using the values obtained in the steps S14 and 15.

Then, the control unit 30 outputs RTI (Return To Input) signal and finishes this interrupt routine.

Next, the manner of operation as to the main routine shown in FIG. 4A will be discussed hereinafter.

This main routine is for adjusting the actual rear wheel steer angle and the range to the target rear wheel steer angle $\delta_{r(n)}$ and the target steer angle generated range Ars which have been determined in the interrupt routine and stored in the memory.

In a step S1, the control unit 30 initializes various values when the vehicle has been just started. In this step S1, all 13 data of the front wheel steer angle in the buffer is cleared and set to zero. If a nonvolatile memory is used as the buffer, the stored data which indicates a parking period may be maintained.

In a step S2, an actual rear wheel steer angle $\delta_{rs}$ is read in the control unit 30 as a feedback value.

In a step S3, an actual wheel steer angle generated range (set value) As is read in the control unit 30 as a feedback value.

It is also to be understood that the diagnosis of the sensor and motor for the rear wheel steer device is carried by reading in the output value from another sensor.

In a step S4, by comparing the actual rear wheel steer angle $\delta_{rs}$ with the target value $\delta_{r(n)}$ obtained in the interrupt routine, an output value to the first servo motor 25A is determined. Similarly, in a step S5, by comparing the actual rear wheel steer angle generated range (set value) As with the target value Ars obtained in the interrupt routine, an output value to the second servo motor 25B is determined.

In a step S6, the control unit 30 transforms the output values determined in the steps S4 and S5 into PWM (pulse-width modulation) signals and outputs the transformed PWM signals for the power supply control to the first and second servo motors 25A and 25B.

Following to this, the main routine returns to the step S2 and repeats the steps S2 to S6 at predetermined time intervals.

Furthermore, the control unit 30 receives a signal indicative of a backward driving of the vehicle from a back-gear select detection switch, a brake depressing condition detecting switch and a sensor for detecting an opening degree of a throttle valve, and judges whether the vehicle is driven backward or not. When the vehicle is driven backward, the rear wheel steer angle is set at a proportional value to the front steer angle without applying the above-mentioned control. More particularly, the rear wheel steer angle is determined from the following equation:

$$\delta_r = K \cdot \delta_f \quad (12)$$

It will be understood that during a backward driving of the vehicle the rear wheel steer angle may be fixed at a neutral position to control the four wheel steer vehicle like as a two wheel steer vehicle.

Furthermore, a centrifugal force to the cornering vehicle, which force increases according to the vehicle speed, is applied to the tires of the wheels while the tires increases a cornering force. During a cornering of the vehicle, the tire of each wheel generates a cornering force. This force produces lateral movement and resists the centrifugal force. By slipping, the tire generates cornering force. Within a range where the slip angle is not too large, cornering force varies linearly and in proportion to the slip angle. Having observed this relation ship, the degree of cornering force generated with respect to the slip angle is expressed as the cornering power. Accordingly, the angle between the travel direction of the front wheel and the center line of the front wheel is decreased by a slip angle, and the angle between the travel direction of the rear wheel and the center line of the rear wheel is increased by a slip angle (in contrast to the front wheel, in the opposite phase direction). Therefore, by estimating the slip angle on the basis of the vehicle speed V, and the front and rear wheel steer angles $\delta_f$ and $\delta_r$, the front wheel steer angle and the rear wheel steer angle are corrected by the estimated slip angle.

Figure 6:
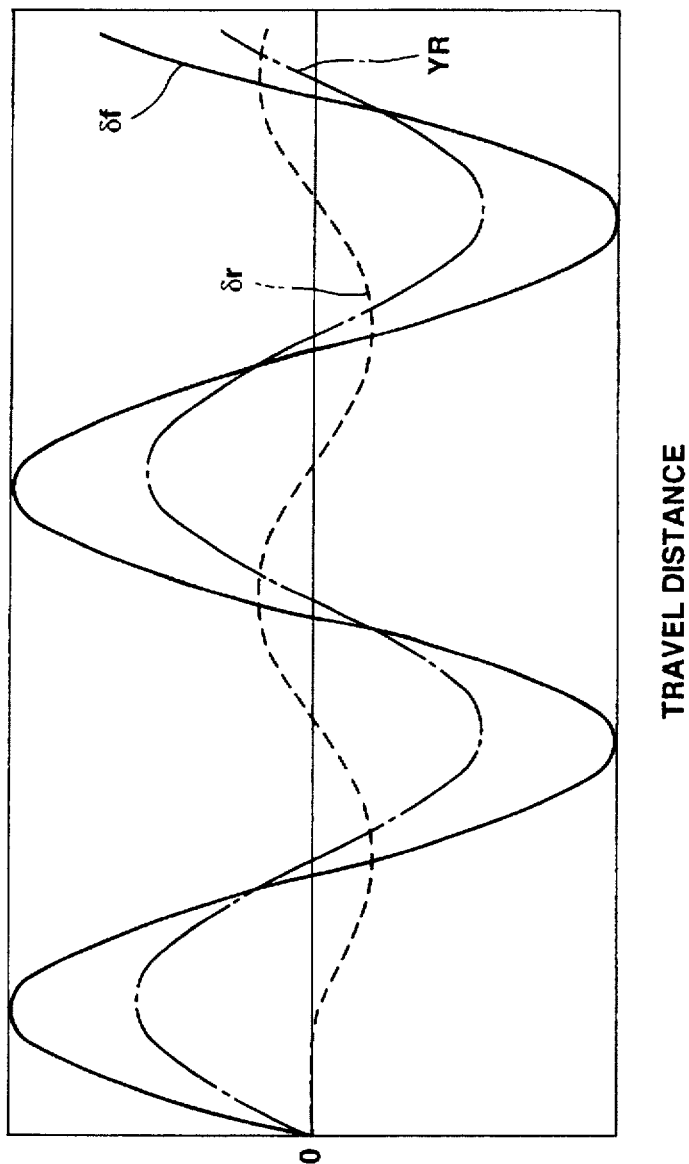
FIG. 6 is a graph which shows a relationship between a vehicle yaw rate and the front and rear wheel steer angles.

FIG. 6 shows a relationship between the front and rear wheel steer angles and the yaw rate YR of the vehicle. As clear from FIG. 6, by the continuous operation of the primary delay control, that is, even if the front wheel steer angle $\delta_f$ is returned to a neutral position ($\delta_f=0$), the rear wheel steer angle $\delta_r$ is not returned to the neutral position simultaneously, and the handling of the steering wheel to a neutral position is not corresponded to the yaw rate condition. Accordingly, drivers have some strange feeling during this handling operation of the vehicle.

Figure 7:
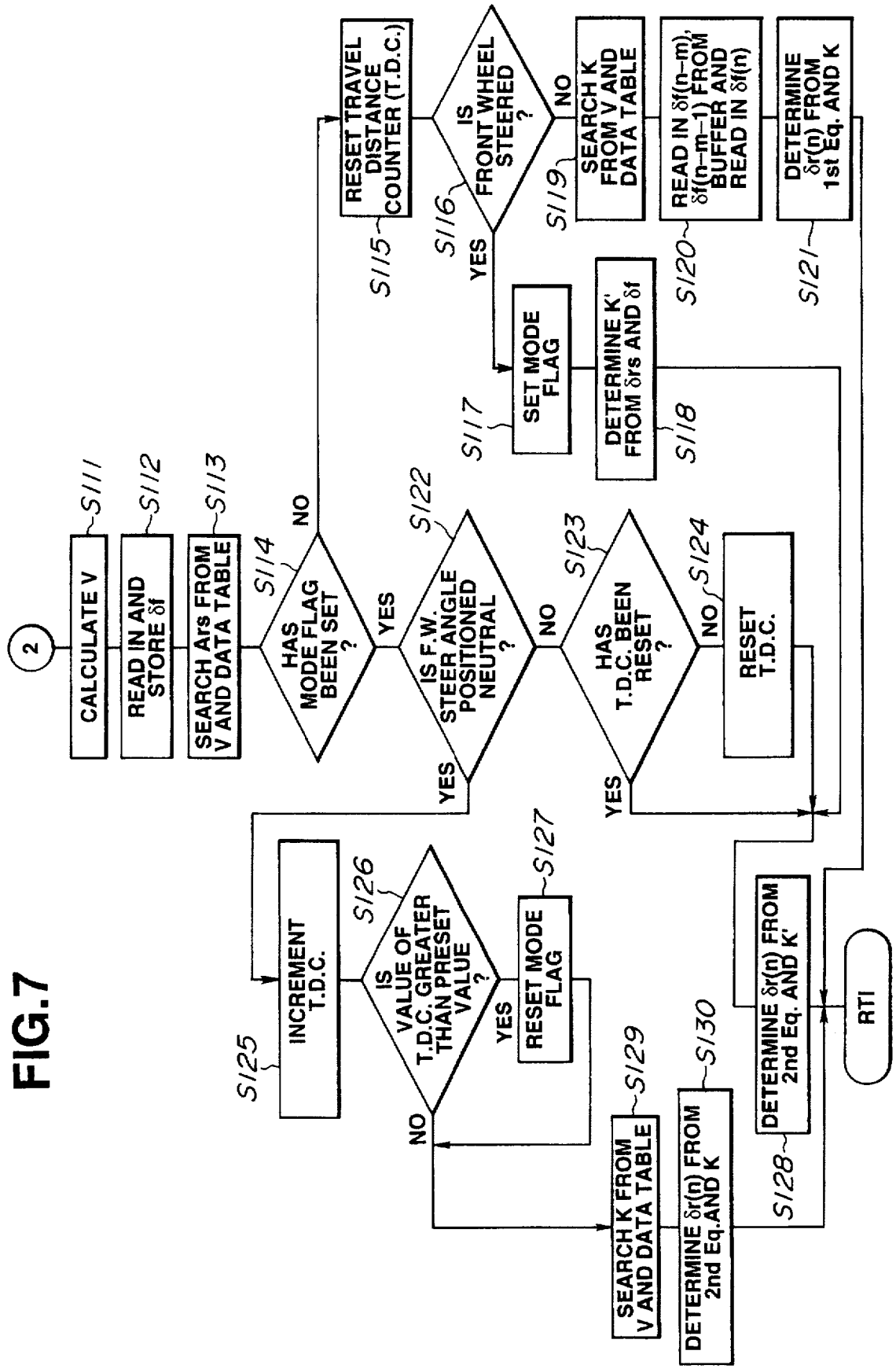
FIG. 7 is a flowchart which shows a control procedure of a second embodiment according to the present invention.

FIG. 7 shows a flowchart which shows a control procedure of a second embodiment of the rear wheel steer control apparatus according to the present invention.

In this second embodiment, the equation for calculating the target value of the rear wheel steer angle is selected according to a change of the steering wheel angle. When the change of the steering wheel angle is plus, that is when the steering wheel angle is increasing, the equation (10) is applied for calculating the target value of the rear wheel steer angle. When the change of the steering wheel angle is minus, that is when the steering wheel angle is decreasing, the following equation is applied for the calculation of the target value.

$$\delta_r = k \cdot \delta_f \quad (13)$$

wherein K is one of a front wheel steer condition K' or the steer angle ratio K.

The manner of control procedure of the second embodiment will be discussed hereinafter with reference to the flowchart of FIG. 7. The control procedure of the second embodiment is proceeded based on the main routine of FIG. 4A. The flowchart of FIG. 7 is an interrupt routine.

The interrupt routine is executed at each pulse generated from the wheel speed sensor 32.

In a step S111, a vehicle speed V is calculated by measuring a time period of this interrupt routine since this interrupt routine is executed in each vehicle movement of 78 mm. Simultaneously, the control unit 30 checks that the wheel speed sensor 32 correctly operate by comparing the output of the wheel speed sensor 32 with a pulse period or frequency of a vehicle speed sensor installed in the engine transmission. If the output of the wheel speed sensor 32 largely differs from that of the other vehicle speed sensor, another routine may be executed such that the steer angle of the rear wheels is gradually returned to a neutral position, then the control of the rear wheel steer angle is stopped and the stoppage of the control due to the abnormal condition of the system is informed to a vehicle passenger.

In a step S112, the control unit 30 reads in the front wheel steer angle $\delta_f$ f and stores as a newest data. It will be understood that the front wheel steer angle may 30 treated as a double check system, that is, by comparing two output values, the correct operation of the sensor is checked. If the sensor is not normally operated, another operation for smoothly stopping the rear wheel steer control is executed, then the stoppage thereof is informed to the vehicle passenger, as is similar to that in the step S111.

In a step S113, the control unit 30 searches the target value of the rear wheel steer angle generated range Ars from the data table according to the vehicle speed V, then stores the obtained target value in a predetermined memory address. As shown in FIG. 5A, the rear wheel steer angle generated range Ars is set so that higher the vehicle speed V becomes, lower the range Ars becomes.

In a step S114, it is judged whether the target value of the rear wheel steer angle $\delta_r$ is calculated by using the second equation (13) or not, by checking the mode flag which is set when the second equation (13) is used for the target value calculation.

When the mode flag is set, the routine proceeds from the step S114 to a step S122. When the mode flag is not set, the routine proceeds to a step S115 wherein the travel distance counter is reset to clear the memory. it will be understood that this step S115 may be positioned at anywhere with steps S116 to S121.

Following to the step S115, in a step S116, it is judged whether or not the front wheels are set at a neutral position from the front wheel steer angle data stored in the buffer. In this case, the 13 data in the buffer is divided into an old group and a new group, then an absolute value of an average value of each of the old and new groups is calculated and compared with each other. When the absolute average value of the old group is greater than that of the new group, it is judged that the steering wheel is controlled toward the neutral position, that is, the steering wheel angle is decreasing. When the steering wheel is controlled to the neutral position, the routine proceeds to a step S117. When the steering wheel is not controlled to the neutral position, the routine proceeds to a step S119.

In the step S117, the mode flag is set, and the control unit 30 determines to calculate the target value of the rear wheel steer angle $\delta_r$ by means of the second equation (13).

In a step S118, a present value of the actual steer angle ratio K' is calculated from the present value of the actual rear wheel steer angle $\delta_{rs}$ and the front wheel steer angle $\delta_f$, and then the obtained ratio K' is written at the predetermined address of the memory.

Herein, the actual steer angle ratio K' is applied to the second equation (13) since the target value of the rear wheel steer angle takes a value which is largely different from the target value obtained from the first equation (10) if the steer angle ratio K obtained from the data table is applied to the second equation (13). This difference generates a strange feeling to a vehicle driver when the steering wheel is handled at the switching position between the minus gradient to the plus gradient. Therefore, the actual steer angle ratio K' is applied to the second equation (13) to smoothly switch the equation. After the step S118, the routine proceeds to a step S124 wherein the target value $\delta_r$ of the rear wheel steer angle is calculated by using the second equation and the actual steer angle ratio K'. Then, the routine outputs RTI (Return To Input) signal and becomes end.

When in the step S116 it is judged that the steering wheel is not controlled at the neutral position, the routine proceeds to the step S119 where the rear wheel steer angle ratio K with respect to the front wheel steer angle is searched from the data table on the basis of the vehicle speed V. As shown in FIG. 5B, the steer angle ratio K is determined to take the same phase when the vehicle speed V is higher than the base (standard) speed Vs and to take the opposite phase when smaller than the standard speed Vs.

In the step S120, the control unit 30 reads in the oldest two data $\delta_{f(n-m)}$ and $\delta_{f(n-m-1)}$ of the stored data in the buffer. In this embodiment, the twelfth data and the thirteenth data correspond to the oldest two data. Then, in a step S121, the present target value $\delta_{r(n)}$ of the rear wheel steer angle is calculated from the first equation (10), the steer angle ratio K and the data obtained in the step S120. After the execution of the step 121, the routine outputs RTI (Return To Input) signal and becomes end.

In the step S114, when the mode flag is set, that is, when the steering wheel is being returned to a neutral position, the routine proceeds to a step S122 wherein it is judged whether the front wheel is positioned in the vicinity of the neutral position or not. For example, it is judged whether the front wheel is positioned within a range ±1 degree of the neutral position or not.

When the front wheels are not positioned in the vicinity of the neutral position, the routine proceeds to a step S123. When they are positioned in the vicinity of the neutral position, the routine proceeds to a step S125.

In the step S123, it is judged whether the travel distance counter has been reset or not. When the travel distance counter has been reset, the routine proceeds to a step S128. When the travel distance counter has not been reset, the routine proceeds to a step S124 wherein the counter is reset. Then, routine proceeds to the step S128 wherein the present target value $\delta_{r(n)}$ of the rear wheels is determined by the second equation (13) and the steer angle ration K'. The routine is repeated until the front wheel is returned in the vicinity of the neutral position.

On the other hand, when the front wheel is positioned in the vicinity of the neutral position, the routine proceeds to the step S125 wherein the travel distance counter is incremented. The travel distance counter is incremented by x such as 78 mm. Then, in a step S126, it is judged whether or not the content of the travel distance counter becomes larger than a preset value such as a wheel base length. When the counter value≧(wheel base length/78), it is judged that the vehicle is driven straight, and the routine proceeds to a step S127 wherein the mode flag is reset, that is, the first equation (10) is used for the calculation of the target value of the rear wheel steer angle. Then, the routine proceeds to the step S129. When the counter value<(wheel base length/78), the routine proceeds to the step S129 where the steer angle ratio K is set by searching the data table on the basis of the vehicle speed V.

In the step S130, the present target value $\delta_{r(n)}$ of the rear wheel steer angle is determined by the second equation (13) and the steer angle ratio K. In this situation, even if the steer angle ratio is changed from K' to K, the rear wheel steer angle is almost not changed. Therefore, the vehicle driver does not have a strange feeling.

As clear from the flowchart of FIG. 7, when it is judged that the content (value) of the travel distance counter becomes larger than the preset value, that is, when it is judged that the vehicle has been driven straight for a predetermined distance, the target value of the rear wheel steer angle is determined by using the first equation (10). When the steering wheel is returning to the neutral position, the second equation (13), which does not cause the time delay of the vehicle yaw rate YR with respect to the front wheel steer angle $\delta_f$, is used for the calculation of the target value of the rear wheel steer angle. Furthermore, when the steering wheel 11 is repeatingly rotated right and left while the neutral position is repeatingly passed, for example, when the vehicle is driven on a winding road, the target value of the rear wheel steer angle is determined by the second equation (13) and the steer angle ratio K as shown in the steps S126, S129 and S130. The determination of the target value of the rear wheel steer angle is repeated until it is judged that the vehicle is driven straight. That is, until the content (value) of the travel distance counter becomes larger than the preset value, this calculation is repeated. If the vehicle is turned after the transition to the straight line driving of the vehicle, the second equation (13) is once used and then the first equation (10) is used after the reset of the mode flag.

With the thus arranged second embodiment, in case that the cornering is started after the straight line driving, the first equation (10) is used for the calculation of the target value of the rear wheel steer angle as the delay control. In case that the vehicle is put in a condition from a cornering to the straight line driving condition, the second equation $\delta_{r=k \cdot \delta_f}$ is used for the calculation of the target value of the rear wheel steer angle. By using the second equation (13), the rear wheel steer angle control apparatus executes a control that no-delay of the vehicle yaw-rate does not occur with respect to the front wheel steer angle. Further, in case that it is judged that the vehicle is driven straight again, the first equation (10) for the delay control is used. Accordingly, the strange feeling in the steering operation is largely reduced.

Figure 8:
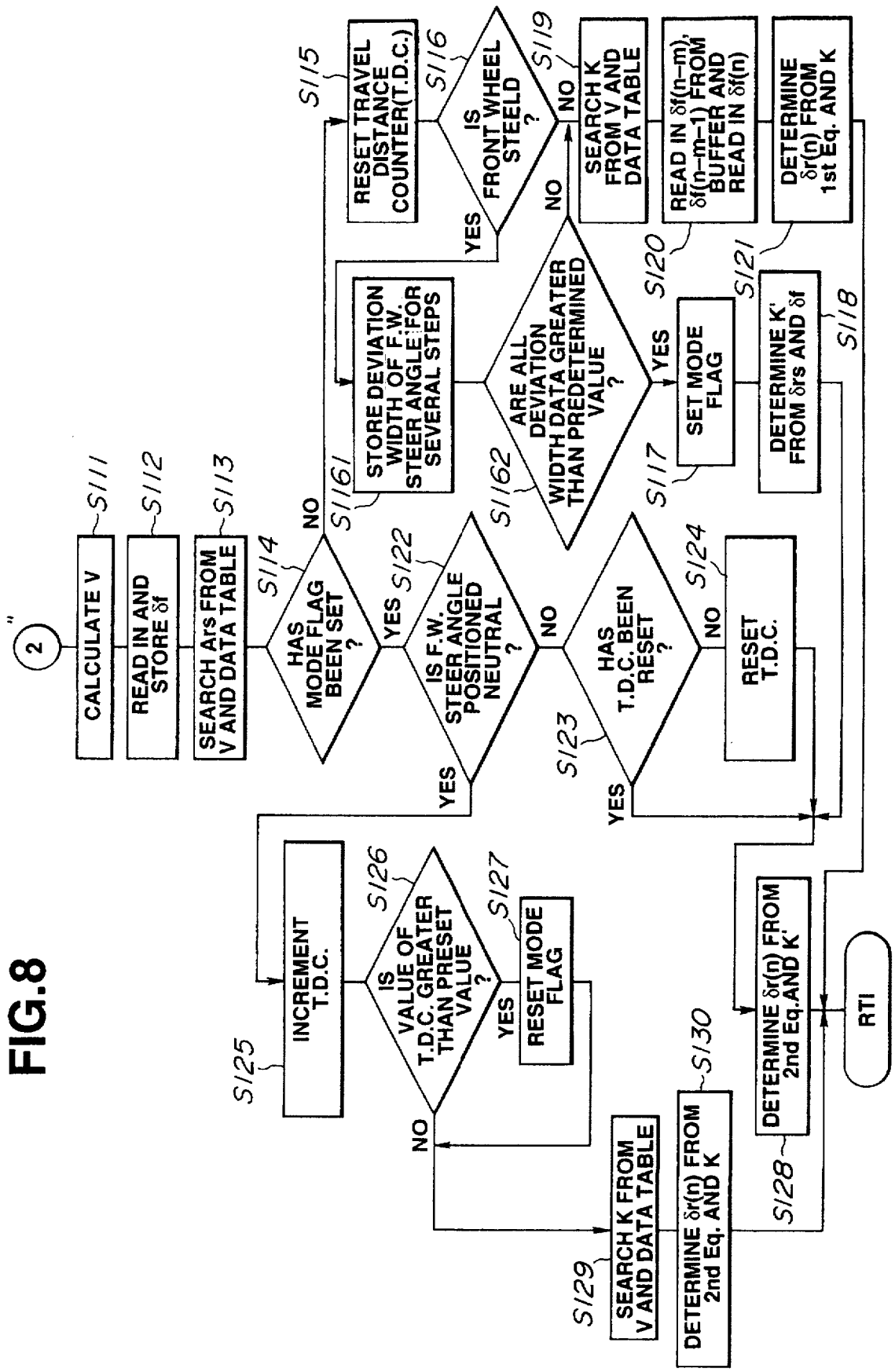
FIG. 8 is a flowchart which shows a control procedure of a third embodiment according to the present invention.

Referring to FIG. 8, there is shown a third embodiment of the rear wheel steer control apparatus of the four wheel steer vehicle according to the present invention.

The third embodiment is generally similar to the second embodiment except that judging steps of the change of the steer angle is further added in the control routine.

As mentioned above, if the delay of the vehicle yaw rate with respect to the front wheel steer angle is generated, the vehicle driver has a strange feeling. On the other hand, when the steering wheel angle is increasing, the delay of the vehicle yaw rate with respect to the front wheel steer angle does not impress the strange feeling to the driver. Further, a feeling that the overhang of the vehicle rear portion is suppressed, is prior to such strange feeling. Since this delay is generated by determining the target value of the rear wheel steer angle with respect to the front steer angle according to the vehicle speed, in case that the front wheel steer angle is comparatively slowly changed, the delay almost does not generate the strange feeling.

Accordingly, in this third embodiment, the usage of the second equation (13) is limited in the case that the driver has a strange feeling by the delay of the vehicle yaw rate. In the other case, the first equation (10) is used.

In concrete, as shown by the flowchart of FIG. 8, steps S1161 and S1262 are added after the step S116.

In the step S1161, the control unit 30 calculates a difference between the present time front wheel steer angle and the previous front wheel steer angle, and a difference between the previous and the two step before and a difference the two steps before and the three steps before. That is, the variation of the front wheel steer angle is stored in the predetermined memory.

In the step S1162, it is judged whether all of the variations of the front wheel steer angles are larger than the preset value such as 2°/78 mm or not. When all of the variations are larger than the preset value, it is judged that the front wheel is quickly returned to the neutral position and therefore the routine proceeds to the step S117. When any one of the variations is not larger than the preset value, it is judged that the front wheel is slowly returned to the neutral position and therefore the routine proceeds to the step S119.

With this arrangement, by using the second equation only when it is judged that the driver intents to return the vehicle in the straight line driving condition, it becomes possible to realize a natural steering characteristics in the four wheel steer vehicle.

What is claimed is:

1. A method for controlling rear wheels of a four wheel steer vehicle, comprising the steps of:

detecting a vehicle speed;

detecting a steer angle of a pair of front wheels;

detecting a steer angle of a pair of rear wheels;

calculating a target steer angle of the rear wheels according to the detected vehicle speed, the detected steer angle of the front wheels and the following equation, $$\delta_r(x) = -\frac{K}{\tau} \cdot \delta_f(x) \cdot e^{-(x-L_r/\tau)}$$

wherein $\delta_r$ is the target steer angle of the rear wheels, $\delta_f$ is the steer angle of the front wheels, K is a steer angle ratio ($\delta_r/\delta_f$), x is a travel distance from start of the vehicle, $L_r$ is a distance from an axis of the rear wheels to a rear end of the vehicle, and $\tau$ is a time constant of a primary delay; and controlling the rear wheels so that the detected steer angle of the rear wheel is converged into the target steer angle of the rear wheels.

2. A method for controlling rear wheels of a four wheel steer vehicle, comprising the steps of:

detecting a vehicle speed;

detecting a steer angle of a pair of front wheels; detecting a steer angle of the rear wheels;

calculating a target steer angle of the pair of rear wheels according to the detected vehicle speed, the detected steer angle of the front wheels, and an equation employing a primary delay control parameter and the steered condition of the front wheels; and controlling the steer angle of the rear wheels so as to be converged into the target steer angle.

3. A method as claimed in claim 2, wherein the steered condition of the front wheels is determined according to an increase or decrease of the front wheel steer angle.

4. A method as claimed in claim 2, wherein the steered condition of the front wheels is determined according to an increase or decrease of the front wheel steer angle and a change rate of the front wheel steer angle.

5. A method as claimed in claim 2 wherein the equation is the following equation:

$$\delta_r(x) = -\frac{K}{\tau} \cdot \delta_f(x) \cdot e^{-(x-L_r/\tau)}$$

wherein $\delta_r$ is the target steer angle of the rear wheels, $\delta_f$ is the steer angle of the front wheels, K is a steer angle ratio ($\delta_r/\delta_f$), x is a travel distance from start of the vehicle, $L_r$ is a distance from an axis of the rear wheels to a rear end of the vehicle, and $\tau$ is a time constant of a primary delay.

6. A method for controlling rear wheels of a four wheel steer vehicle, comprising the steps of:

detecting a vehicle speed;

detecting a steer angle of a pair of front wheels;

detecting a steer angle of the rear wheels;

calculating a target steer angle of the pair of rear wheels according to the detected vehicle speed, the detected steer angle of the front wheels and a following equation (A) when the vehicle is driven forward, $$\delta_r(x) = -\frac{K}{\tau} \cdot \delta_f(x) \cdot e^{-(x-L_r/\tau)} \quad \text{(A)}$$

wherein $\delta_r$ is the target steer angle of the rear wheels, $\delta_f$ is the steer angle of the front wheels, K is a steer angle ratio ($\delta_r/\delta_f$), x is a travel distance from start of the vehicle, $L_r$ is a distance from an axis of the rear wheels to a rear end of the vehicle, and $\tau$ is a time constant of a primary delay;

calculating the target steer angle of the pair of rear wheels according to the detected vehicle speed, the detected steer angle of the front wheels and a following equation (B) when the vehicle is driven backward, $$\delta_r = k \cdot \delta_f \quad \text{(B)}$$

wherein k is one of a front wheel steer condition K' or the steer angle ratio K; and controlling the rear wheels so that the detected steer angle of the rear wheel is converged into the target steer angle of the rear wheels.

7. A method for controlling rear wheels of a four wheel steer vehicle, comprising the steps of:

detecting a vehicle speed;

detecting a steer angle of a pair of front wheels;

detecting a steer angle of the rear wheels;

calculating a target steer angle of the pair of rear wheels according to the detected vehicle speed, the detected steer angle of the front wheels and a following equation (A) when the vehicle is driven forward and the front wheel steer angle is increasing, $$\delta_r(x) = -K/\tau \cdot \delta_f(x) \cdot e^{-(x-L_r/\tau)}$$

wherein $\delta_r$ is the target steer angle of the rear wheels, $\delta_f$ is the steer angle of the front wheels, K is a steer angle ratio ($\delta_r/\delta_f$), x is a travel distance from start of the vehicle, $L_r$ is a distance from an axis of the rear wheels to a rear end of the vehicle, and $\tau$ is a time constant of a primary delay;

calculating said target steer angle of the pair of rear wheels according to the detected vehicle speed, the detected steer angle of the front wheels and a following equation (B) when the vehicle is driven forward and the front wheel steer angle is decreasing, $$\delta_r = k \cdot \delta_f \quad \text{(B)}$$

wherein k is one of a front wheel steer condition K' or the steer angle ratio K; and controlling the rear wheels so that the detected steer angle of the rear wheel is converged into the target steer angle of the rear wheels.

8. A method as claimed in claim 7, wherein the target steer angle of the rear wheels is calculated by using the equation (A) when the front wheel steer angle is increasing after the vehicle has been driven straight for a predetermined distance, by using the equation (B) and k=K' when the front wheel steer angle is being returned in the vicinity of a neutral position after changed from an increasing condition to a decreasing condition, and by using the equation (B) and k=K when the vehicle does not keep a straight line driving for the predetermined distance after the front wheel steer angle is returned in the vicinity of the neutral position.

9. A method as claimed in claim 7, wherein the target steer angle of the rear wheels is calculated by using the equation (A) when the front wheel steer angle is decreasing and a change rate of the front wheel steer angle is smaller than a predetermined value, and by using the equation (B) and k=K' when the change rate of the front wheel steer angle is larger than the predetermined value.

10. A rear wheel steer control apparatus of a four wheel steer vehicle comprising:

a front wheel steer angle detecting means for detecting a steer angle of a pair of front wheels;

a vehicle travel distance detecting means for detecting a travel distance of the vehicle;

a vehicle speed detecting means for detecting a speed of the vehicle;

a steer angle ratio setting means for setting the steer angle ratio (K) between the front wheel steer angle and rear wheel steer angle according to the vehicle speed;

a target rear wheel steer angle calculating means for calculating the target rear wheel steer angle on the basis of the detected values of said front wheel steer angel detecting means and said travel distance detecting means and the following equation, $$\delta_r(x) = -\frac{K}{\tau} \cdot \delta_f(x) \cdot e^{-(x-L_r/\tau)}$$

wherein $\delta_r$ is the target steer angle of the rear wheels, $\delta_f$ is the steer angle of the front wheels, K is a steer angle ratio ($\delta_r/\delta_f$), x is said travel distance from start of the vehicle, $L_r$ is a distance from an axis of the rear wheels to a rear end of the vehicle, and $\tau$ is a time constant of a primary delay;

a rear wheel steer angle detecting means for detecting an actual steer angle of a pair of rear wheels; and a rear wheel steer angle controlling means from controlling the steer angle of the rear wheels such that the actual rear wheel steer angle is adjusted at the target wheel steer angle.

11. A rear wheel steer control apparatus of a four wheel steer vehicle comprising:

a front wheel steer angle detecting means for detecting a steer angle of a pair of front wheels;

a vehicle travel distance detecting means for detecting a travel distance of the vehicle;

a vehicle speed detecting means for detecting a speed of the vehicle;

a steer angle ratio setting means for setting a ratio (K) between the front wheel steer angle and the rear wheel steer angle according to the vehicle speed;

a vehicle travel direction detecting means for detecting a travel direction of the vehicle;

a first target rear wheel steer angle calculating means for calculating a target rear wheel steer angle on the basis of the detected values of said front wheel steer angle detecting means and said travel distance detecting means, and a following first equation, $$\delta_r(x) = -\frac{K}{\tau} \cdot \delta_f(x) \cdot e^{-(x-L_r/\tau)}$$

wherein $\delta_r$ is the target steer angle of the rear wheels, $\delta_f$ is the steer angle of the front wheels, K is a steer angle ratio ($\delta_r/\delta_f$), x is said travel distance from start of the vehicle, $L_r$ is a distance from an axis of the rear wheels to a rear end of the vehicle, and $\tau$ is a time constant of a primary delay;

a rear wheel steer angle detecting means for detecting an actual steer angle of the rear wheels;

a second rear wheel steer angle calculating means for calculating the target rear wheel steer angle on the basis of the detected values of said steer angle ratio setting means, and the following second equation, $$\delta_r = k \cdot \delta_f$$

wherein k is the steer angle ratio K;

a switching means for switching the execution of the calculations of said first and second target rear wheel steer angle calculating means according to the detected result of said vehicle travel direction detecting means such that the calculation by said first target rear wheel steer angle calculating means is executed when the vehicle runs forward and that the calculation by said second target rear wheel steer angle calculating means is executed when the vehicle runs backward; and a rear wheel steer angle controlling means for controlling the steer angle of the rear wheel such that the actual rear wheel steer angle is adjusted at the target rear wheel steer angle which is calculated by one of said first and second target rear wheel steer angle calculating means.

12. A rear wheel steer control device of a four wheel steer vehicle, said rear wheel steer control device comprising:

a front wheel steer condition detecting means for detecting a steer angle and a steering direction of the front wheels;

a vehicle travel distance detecting means for detecting a travel distance of the vehicle;

a steer angle ratio setting means for setting the steer angle ratio (K) between the front and rear wheels;

a first target rear wheel steer angle calculating means for calculating the target rear wheel steer angle on the basis of the detected values of said front wheel steer condition detecting means and said travel distance detecting means and a following first equation, $$\delta_r(x) = -\frac{K}{\tau} \cdot \delta_f(x) \cdot e^{-(x-L_r/\tau)}$$

wherein $\delta_r$ is the target steer angle of the rear wheels, $\delta_f$ is the steer angle of the front wheels, K is said steer angle ratio ($\delta_r/\delta_f$), x is said travel distance from start of the vehicle, $L_r$ is a distance from an axis of the rear wheels to a rear end of the vehicle, and $\tau$ is a time constant of a primary delay;

a rear wheel steer angle detecting means for detecting an actual steer angle of the rear wheels;

a front and rear wheel steer angle ratio calculating means for calculating an actual steer angle ratio (K') from said actual rear wheel steer angle detected by said rear wheel actual steer angle detecting means and the steer angle of the front wheels;

a second rear wheel steer angle calculating means for calculating the target rear wheel steer angle on the basis of one of said steer angle ratio (K) and the actual steer angle ratio (K') and the following second equation, $\delta_r = k \cdot \delta_f$ wherein k is one of the actual steer angle ratio K' and the steer angle ratio K; and a rear wheel steer angle controlling means for controlling the steer angle of the rear wheels such that the actual rear wheel steer angle is adjusted at the target rear wheel steer angle which is calculated by one of said first and second target rear wheel steer angle calculating means.

13. A rear wheel steer control device of a four wheel steer vehicle, said rear wheel steer control device comprising:

a front wheel steer condition detecting means for detecting a steer angle and a steering direction of the front wheels;

a vehicle travel distance detecting means for detecting a travel distance of the vehicle;

a vehicle speed detecting means for detecting a speed of the vehicle;

a steer angle ratio setting means for setting the steer angle ratio (K) between the front and rear wheels;

a vehicle driven direction means for detecting a travel direction of the vehicle;

a first target rear wheel steer angle calculating means for calculating the target rear wheel steer angle on the basis of the detected values of said front wheel steer condition detecting means and said travel distance detecting means and a following first equation, $$\delta_r(x) = -\frac{K}{\tau} \cdot \delta_f(x) \cdot e^{-(x-L_r/\tau)}$$

wherein $\delta_r$ is the target steer angle of the rear wheels, $\delta_f$ is the steer angle of the front wheels, K is said steer angle ratio $(\delta_r/\delta_f)$, x is said travel distance from start of the vehicle, $L_r$ is a distance from an axis of the rear wheels to a rear end of the vehicle, and τ is a time constant of a primary delay;

a rear wheel steer angle detecting means for detecting an actual steer angle of the rear wheels;

a front and rear wheel steer angle ratio calculating means for calculating an actual steer angle ratio (K') from said actual rear wheel steer angle detected by said rear wheel actual steer angle detecting means and the steer angle of the front wheels;

a second rear wheel steer angle calculating means for calculating the target rear wheel steer angle on the basis of one of said steer angle ratio (K) and the actual steer angle ratio (K') and the following second equation $\delta_r = k \cdot \delta_f$ wherein k is one of the actual steer angle ratio K' and the steer angle ratio K;

a switching means for switching the execution of the calculations of the first and second target rear wheel angle calculating means such that in case that said vehicle driven direction detecting means detects that the vehicle is running forward, the calculation of the first target rear wheel steer angle calculating means is executed when the front wheel steer angle is increasing, and the calculation of said second target rear wheel steer angle calculating means is executed by using K' as k when the front wheel is decreasing; and a rear wheel steer angle controlling means for controlling the steer angle of the rear wheels such that the actual rear wheel steer angle is adjusted at the target rear wheel steer angle which is calculated by one of said first and second target rear wheel steer angle calculating means.

14. A device as claimed in claim 13, wherein said switching means selects the calculation of said first target rear wheel steer angle calculating means when the front wheel steer angle is increasing after the vehicle has been driven for a predetermined distance, selects the calculation of said second target wheel steer angle calculating means and uses K' as k when the front wheel steer angle is approaching a neutral position after changed from the increasing condition to the decreasing condition, and selects the calculation of said second target wheel steer angle calculating means and uses K as k when the vehicle does not keep a straight line driving for the predetermined distance after the front wheel steer angle is returned in the vicinity of the neutral position.

15. A device as claimed in claim 13, wherein said front wheel steer condition detecting means includes a means for detecting a change rate of the front wheel steer angle, and said switching means selects the calculation of said second target wheel steer angle calculating means and uses K' as k when the front wheel steer angle is decreasing and the change rate of the front wheel steer angle is larger than a predetermined value.

16. A method for controlling rear wheels of a four wheel steer vehicle, comprising the steps of:

detecting a vehicle speed;

detecting a steer angle of a pair of front wheels; detecting a steer angle of a pair of rear wheels;

calculating a target steer angle of the rear wheels according to the detected vehicle speed, the detected steer angle of the front wheels and the following equation, $$\delta_r(s) = e^{-L_r s} \cdot \frac{K}{1+\tau s} \cdot \delta_f(s)$$

wherein $\delta_r$ is the target steer angle of the rear wheels, $\delta_f$ is the steer angle of the front wheels, K is a steer angle ratio $(\delta_r/\delta_f)$ x is a travel distance from start of the vehicle, $L_r$ is a distance from an axis of the rear wheels to a rear end of the vehicle, and τ is a time constant of a primary delay; and controlling the rear wheels so that the detected steer angle of the rear wheel is converged into the target steer angle of the rear wheels.

17. A rear wheel steer control apparatus of a four wheel steer vehicle comprising:

a front wheel steer angle detecting means for detecting a steer angle of a pair of front wheels;

a vehicle travel distance detecting means for detecting a travel distance of the vehicle;

a vehicle speed detecting means for detecting a speed of the vehicle;

a steer angle ratio setting means for setting the steer angle ratio (K) between the front wheel steer angle and rear wheel steer angle according to the vehicle speed;

a target rear wheel steer angle calculating means for calculating the target rear wheel steer angle on the basis of the detected values of said front wheel steer angle detecting means and said travel distance detecting means and the following equation, $$\delta_r(s) = e^{-L_r s} \cdot \frac{K}{1+\tau s} \cdot \delta_f(s)$$

wherein $\delta_r$ is the target steer angle of the rear wheels, $\delta_f$ is the steer angle of the front wheels, K is said steer angle ratio ($\delta_r/\delta_f$). x is said travel distance from start of the vehicle, $L_r$ is a distance from an axis of the rear wheels to a rear end of the vehicle, and $\tau$ is a time constant of a primary delay;

a rear wheel steer angle detecting means for detecting an actual steer angle of a pair of rear wheels; and a rear wheel steer angle controlling means for controlling the steer angle of the rear wheels such that the actual rear wheel steer angle is adjusted at the calculated target rear wheel steer angle.

* * * * *